H. H. STYLL.
GOGGLES.
APPLICATION FILED NOV. 30, 1917.

1,265,546.

Patented May 7, 1918.

Inventor,
HARRY H. STYLL

H. H. Styll & H. H. Parsons
Attorneys

UNITED STATES PATENT OFFICE.

HARRY H. STYLL, OF SOUTHBRIDGE, MASSACHUSETTS.

GOGGLES.

1,265,546.  Specification of Letters Patent.  Patented May 7, 1918.

Application filed November 30, 1917. Serial No. 204,648.

*To all whom it may concern:*

Be it known that I, HARRY H. STYLL, a citizen of the United States, residing at Southbridge, in the county of Worcester and State of Massachusetts, have invented certain new and useful Improvements in Goggles, of which the following is a specification.

This invention relates to new and useful improvements in goggles and more particularly to a yieldable nose bridge therefor, the main object of the present invention being the provision of a nose bridge for goggles which is constructed of a yieldable material whereby the same may be readily adjusted to position the saddle member of the bridge upon the face of the wearer.

Another object of the present invention is the provision of an adjustable nose bridge formed of a single piece of material which is preferably yieldable whereby the lens frames, to which the same is connected, may be easily adjusted to increase or decrease the P. D. of the lenses.

A further object of the present invention is the provision of a nose bridge for goggles that is not only adjustable with respect to the saddle member, but in which the frame members can be readily adjusted toward or away from each other equally as well.

With the above and other objects in view the invention consists in the novel features of construction and the combination and arrangement of parts hereinafter more fully described, pointed out in the claims and shown in the accompanying drawings, in which—

Figure 1:
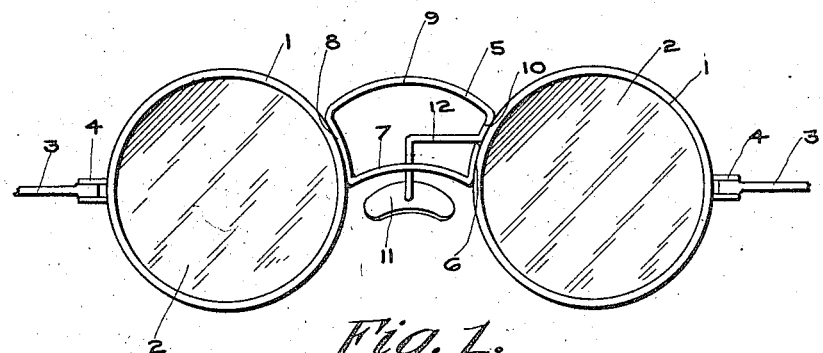
Figure 1 is a front elevation of a pair of goggles constructed in accordance with my invention.

Referring now more particularly to the drawings in which the various parts are designated throughout the several views by the various reference characters, the numeral 1 indicates the frames of the goggles, having mounted therein the lenses 2. In order to support the frames upon the face a pair of temples 3 are provided and are secured to the frames at the outer side thereof as illustrated at 4, said temples being pivoted to the frames whereby they may be readily folded inwardly upon the frames when not in use.

The bridge member which is indicated by the numeral 5 is preferably formed of a single piece of flexible wire whereby the frames can be readily adjusted toward or away from each other so as to reduce or increase the P. D. In forming the bridge one end of the wire is secured to the inner side of one of the frames, by soldering or any other suitable means, as shown at 6, the wire is then extended across to the other frame to provide the curved member 7 which constitutes the lower portion of the bridge. The wire after spanning the space between the frames is curved to conform to the shape of the exterior of one of the frames and soldered or otherwise secured thereto as shown at 8.

In forming the upper curved portion of the bridge the wire is extended across from the securing point 8 and slightly curved as shown at 9 to correspond with the curvature of the lower portion of the bridge 7. After the upper curved portion has been formed the wire is bent upon itself as shown at 10 and soldered or otherwise secured to the frame in order to securely hold the bridge in position with respect to the frames 1. In order to provide for a supporting arm for the saddle member 11 a substantially horizontal portion 12 is extended inwardly from the curved portion 10 and then bent downwardly to provide a substantially vertical portion upon the lower end of which is the saddle member 11 adapted to be secured in position in any suitable manner.

Figure 2:
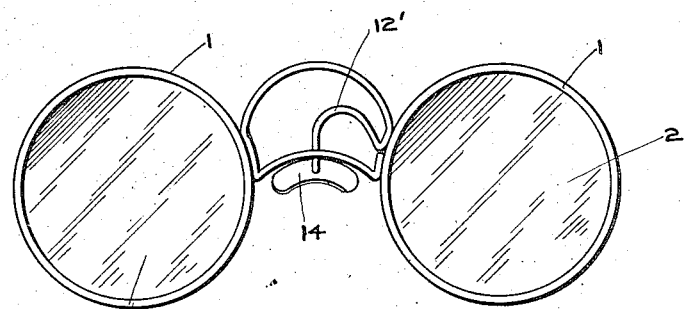
Fig. 2 is a front elevation of a modified form of the invention.

In Fig. 2 I have illustrated a modified form of the invention wherein the portion 12′ is provided with a curve which lies in a plane substantially the same as the upper portion of the bridge and supports upon its lower end the saddle member 14. In this, as well as in the preferred form of the invention, the saddle member is disposed in the rear of the bridge member whereby the same will be fitted tightly to the nose.

Figure 3:
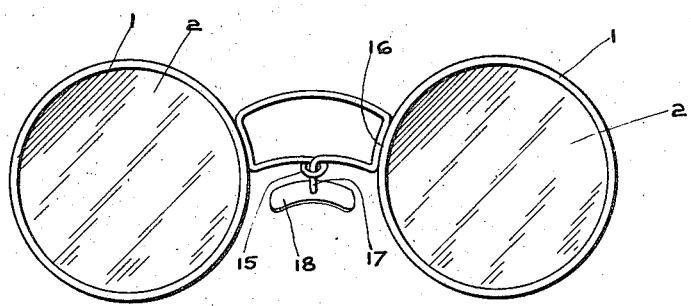
Fig. 3 is a similar view illustrating still another form of the invention.

In Fig. 3 I have illustrated another modified form of the invention wherein the bridge member is formed in substantially rectangular shape and in this form of the invention the wire which forms the bridge is bent upon itself to provide the loop or eye 15. After the eye 15 has been formed the wire is extended across the space between the frames and then curved to conform to the shape of the exterior of the frame and soldered or otherwise secured to the frame to hold the same in place. The wire after being secured to one of the frames is then extended across again to the other frame and secured thereto as shown at 16, thence extended in a horizontal plane and bent downwardly in a substantially vertical plane as shown at 17 to provide for a support for the saddle member 18. This saddle 18 is preferably suspended beneath the bridge members and directed inwardly toward the face.

It will be noted that the eye 15 forms a suitable guide for the vertical portion of the bridge whereby the saddle member 18 will be securely retained in position, but at the same time a vertical movement can be readily imparted to the saddle. In this form of the invention the bridge member is of substantially rectangular form as clearly illustrated in Fig. 3 and it will be readily apparent that the P. D. of the frames can be very easily reduced or increased at the will of the wearer.

I claim:

1. A pair of goggles including spaced frames, a bridge member including a rectangular frame of a single piece of wire, one end of said wire being bent to form a loop and the other end movably disposed within the loop.

2. A pair of goggles including spaced frames, a bridge member including a rectangular frame of a single piece of wire, one end of said wire being bent to form a loop and the other end movably disposed within the loop and a saddle member carried by the last mentioned end of the wire.

3. A bridge for opthalmic mountings including a substantially rectangular frame member formed of a single piece of material and having one end bent to form a loop and having its other end movably disposed through the loop.

4. A device of the class described including a pair of lens frames, means for connecting said frames in spaced relation, an L-shaped arm extending inwardly from one side of the connecting means and having a nose rest supported at its lower end.

5. A device of the class described including a pair of lens frames, a substantially rectangular connecting member of yieldable material disposed between said frames, said connecting member being formed of wire and having one of its ends extending inwardly between the frames and thence downwardly and a nose rest carried by the lower end of the downwardly extending arm.

6. A device of the class described including a pair of lens frames, a connecting member disposed between said frames, said connecting member being formed of wire and having one of its ends extending inwardly beyond the frames and thence downwardly, and a nose rest carried by the lower end of the downwardly extending end.

In testimony whereof I have affixed my signature, in presence of two witnesses.

HARRY H. STYLL.

Witnesses:
H. E. COLEMAN,
A. S. CANN.